United States Patent
Chen

(10) Patent No.: US 7,634,005 B2
(45) Date of Patent: *Dec. 15, 2009

(54) METHOD AND APPARATUS FOR SYNCHRONIZED RECORDING OF AUDIO AND VIDEO STREAMS

(75) Inventor: Cheng-Che Chen, Kao-Hsiung (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 901 days.

This patent is subject to a terminal disclaimer.

(21) Appl. No.: 10/906,457

(22) Filed: Feb. 21, 2005

(65) Prior Publication Data

US 2006/0104344 A1 May 18, 2006

Related U.S. Application Data

(60) Provisional application No. 60/522,859, filed on Nov. 15, 2004.

(51) Int. Cl.
*H04N 7/12* (2006.01)
*H04B 1/66* (2006.01)

(52) U.S. Cl. .................................. 375/240.1

(58) Field of Classification Search ............... 375/240.1
See application file for complete search history.

(56) References Cited

U.S. PATENT DOCUMENTS

| 5,481,543 A * | 1/1996 | Veltman ..................... 370/473 |
| 5,808,722 A * | 9/1998 | Suzuki ........................ 352/12 |
| 6,163,647 A | 12/2000 | Terashima |
| 6,404,818 B1 * | 6/2002 | Obikane ................. 375/240.28 |
| 6,744,815 B1 | 6/2004 | Sackstein et al. |
| 2006/0104344 A1 | 5/2006 | Chen |

FOREIGN PATENT DOCUMENTS

| DE | 10 2005 050 32 A1 | 6/2006 |
| EP | 0 268 481 A2 | 5/1988 |
| EP | 0 667 713 A2 | 8/1995 |
| EP | 1 549 062 A1 | 6/2005 |
| JP | 2001-339679 A | 12/2001 |
| JP | 2005-045829 A | 2/2005 |

* cited by examiner

*Primary Examiner*—Nhon T Diep
(74) *Attorney, Agent, or Firm*—Winston Hsu

(57) ABSTRACT

A method for synchronized recording of audio and video signals is provided. The video signals are grouped into a plurality of video frames. The method comprises the steps of incrementing a counter value of an audio counter when an audio signal is received; and recording the current counter value of the audio counter when a video frame is received.

8 Claims, 3 Drawing Sheets

METHOD AND APPARATUS FOR SYNCHRONIZED RECORDING OF AUDIO AND VIDEO STREAMS

BACKGROUND

The present invention relates to a method and apparatus for recording of audio and video streams, and particularly, to a method and apparatus for synchronized recording of audio and video streams.

Methods and systems for synchronized recoding audio and video streams are known in the art. Generally, the encoding process consists of three stages. The first stage is digitizing the analog audio source and video source. The audio source is composed of a plurality of audio frames and each of the audio frames comprises a specific number of audio samples. Similarly, the video source is composed of a plurality of video frames. The second stage is compression of the digital audio and video frames to separately create an audio stream and a video stream. The audio stream is composed of the plurality of compressed audio frames. The video stream is composed of the plurality of compresses video frames. The third stage is multiplexing the audio and video streams into a single stream. The decoding process consists of inversing each of these stages and applying them in the reverse order.

Please refer to FIG. 1. FIG. 1 is a block diagram of a traditional encoding system 10. The encoding system 10 includes an audio encoder 20, a video encoder 30, and a multiplexer 40. The audio encoder 20 includes an audio analog to digital converter (A/D) 22 and an audio compressor 24. The video encoder 30 includes a video A/D 32 and a video compressor 34. The audio compressor 24 is connected to the audio A/D 22 and to the multiplexer 40. The video compressor 34 is connected to the video A/D 32 and to the multiplexer 40. An A/D converter is also known as a digitizer.

Unfortunately, when the audio signals output from the audio encoder 20 and the video signals output from the video encoder 30 reach the multiplexer 40, there is no way to know exactly when the audio and video signals were digitized. That is, audio signals that were digitized at a certain time should be associated with video signals that were digitized at the same time. Since the audio compressor 24 and the video compressor 34 do not always compress signals at the same rate, the compressed audio frame and its corresponding compressed video frame may not reach the multiplexer 40 at the same time. In addition, the timing information of digitalizing the analog audio source and video source in the audio A/D converter 22 and video A/D converter 32 are lost while the video and audio streams are inputted to the multiplexer 40, and therefore the video and audio streams will be out-of-synchronization.

To solve this problem, Sackstein, et al. proposes an encoding system in U.S. Pat. No. 6,744,815, which is herein incorporated by reference. Please refer to FIG. 2, which is a block diagram of an encoding system 100 according to the related art.

Encoding system 100 includes an audio encoder 110, a video encoder 130, an audio buffer 140, a video buffer 144, a controller 142, and a multiplexer 150.

The audio encoder 110 includes an audio A/D converter 114, an audio compressor 120, and an audio clock 112 connected to the audio A/D converter 114 and to an audio source. The video encoder 130 includes a video A/D converter 134, a video compressor 136, and a video clock 132 connected to the video A/D converter 134 and to a video source.

The audio buffer 140 is connected to the audio compressor 120, the controller 142, and the multiplexer 150. The video buffer 144 is connected to the video compressor 136, the controller 142, and the multiplexer 150. The audio compressor 120 includes an input buffer 122, for temporal storage of audio samples, and a CPU 124, connected therebetween. The controller 142 is further connected to the input buffer 122.

The audio A/D converter 114 provides digital audio samples to the compressor 120 at a rate dictated by its sampling audio clock 112. The compressor 120 has no knowledge of the pass of time except through the samples that arrive at its input.

As mentioned above, the audio compressor 24 and the video compressor 34 do not always compress signals at the same rate, and in order to obtain the encoding rate difference between the audio compressor 24 and the video compressor 34, the CPU 124 stores the compressed audio frames (audio samples) in the audio buffer 140 and the video compressor 136 stores the compresses video frames in the video buffer 144, and therefore, the controller 142 can know the encoding rate difference between the audio compressor 24 and the video compressor 34 by analyzing the number of audio samples in the audio buffer 140 and the number of the video frames in the video buffer 144 by increasing or decreasing the number of audio samples in the input buffer 122, the audio and video streams can be synchronized and multiplexed together in the multiplexer 150.

After analyzing the contents of the audio buffer 140 and the video buffer 144, the controller 142 provides feedback to the input buffer 122 for altering the audio samples contained in the input buffer 122. For instance, decrementing the write pointer in the input buffer 122 decreases the number of audio samples therein, while duplicating an audio sample in the input buffer 122 increases the number of audio samples therein.

Accordingly, the conventional encoding system 100 is only able to achieve synchronized recording of the audio and video steams by removing or adding audio samples stored in the input buffer 122 while the error of audio/video synchronization occurs.

SUMMARY OF INVENTION

It is therefore an objective of the claimed invention to provide a method and apparatus for synchronized recording of audio and video streams in order to solve the above-mentioned problems.

According to the claimed invention, a method for synchronized recording of audio and video signals is provided. The video signals are grouped into a plurality of video frames. The method comprises the steps of incrementing a counter value of an audio counter when an audio signal is received; and recording the current counter value of the audio counter when a video frame is received.

The invention also relates to an apparatus for synchronized recording of audio and video signals. The video signals are grouped into a plurality of video frames. The apparatus comprises an audio counter for incrementing a counter value when an audio signal is received; and a time stamp buffer for recording the current counter value of the audio counter when a video frame is received.

It is an advantage of the present invention that the video signals are time stamped in terms of the reference clock used for encoding the audio signals. In this way, the video signals can be properly and accurately synchronized with the audio signals for creating a synchronized recording of audio and video streams.

These and other objectives of the present invention will no doubt become obvious to those of ordinary skill in the art after

DETAILED DESCRIPTION

Figure 1:
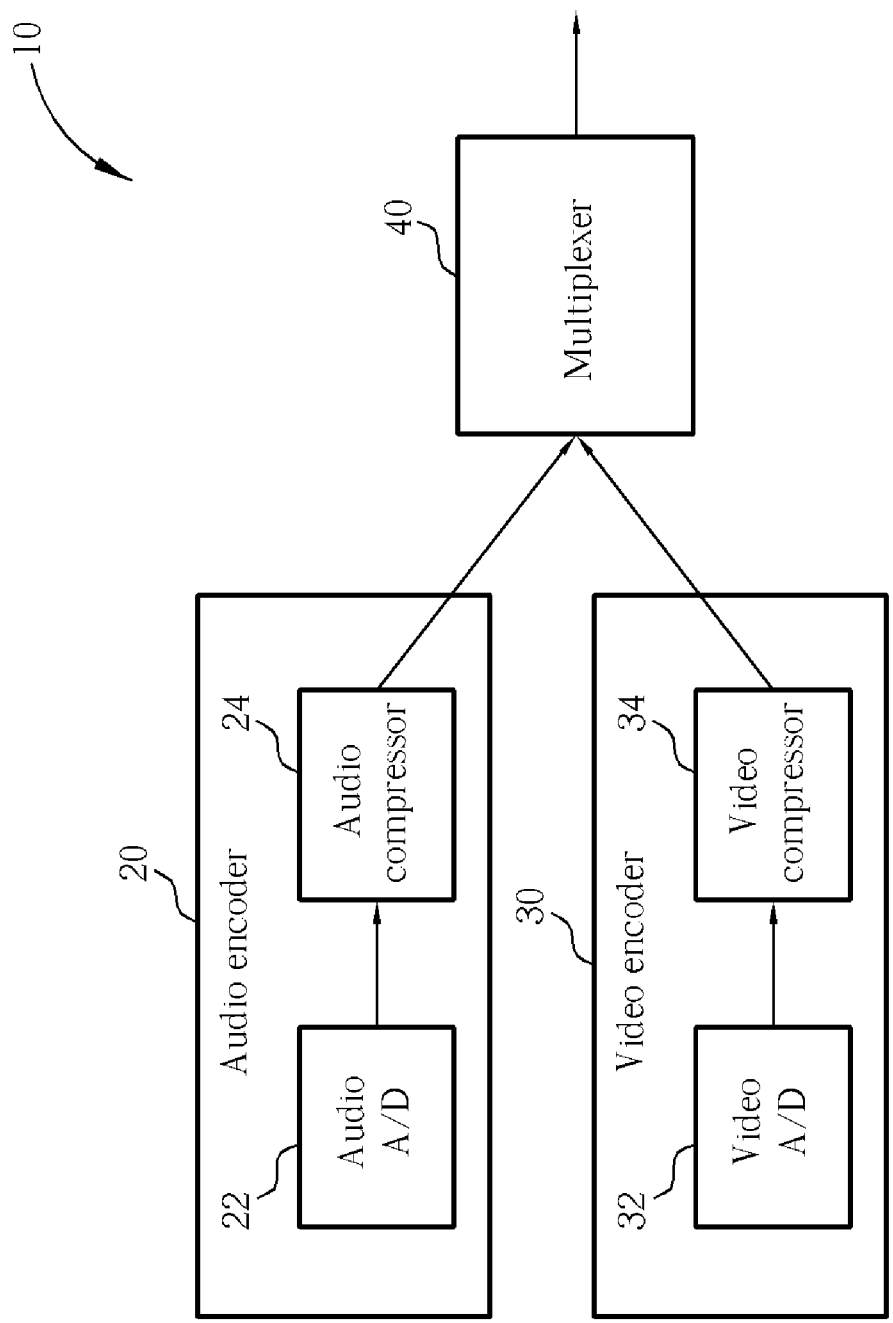
FIG. 1 is a block diagram of a traditional encoding system.
Figure 2:
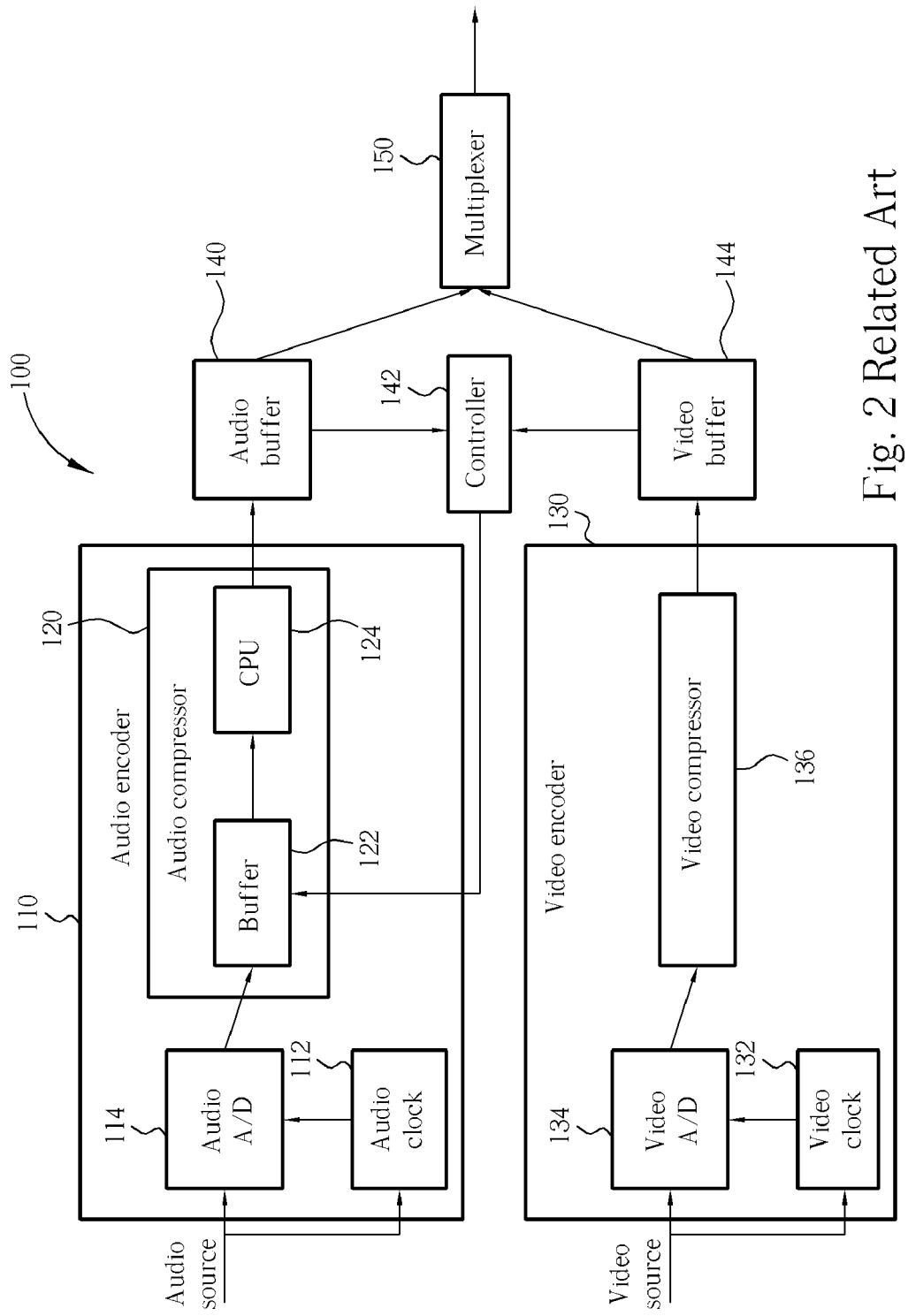
FIG. 2 is a block diagram of another encoding system according to the related art.
Figure 3:
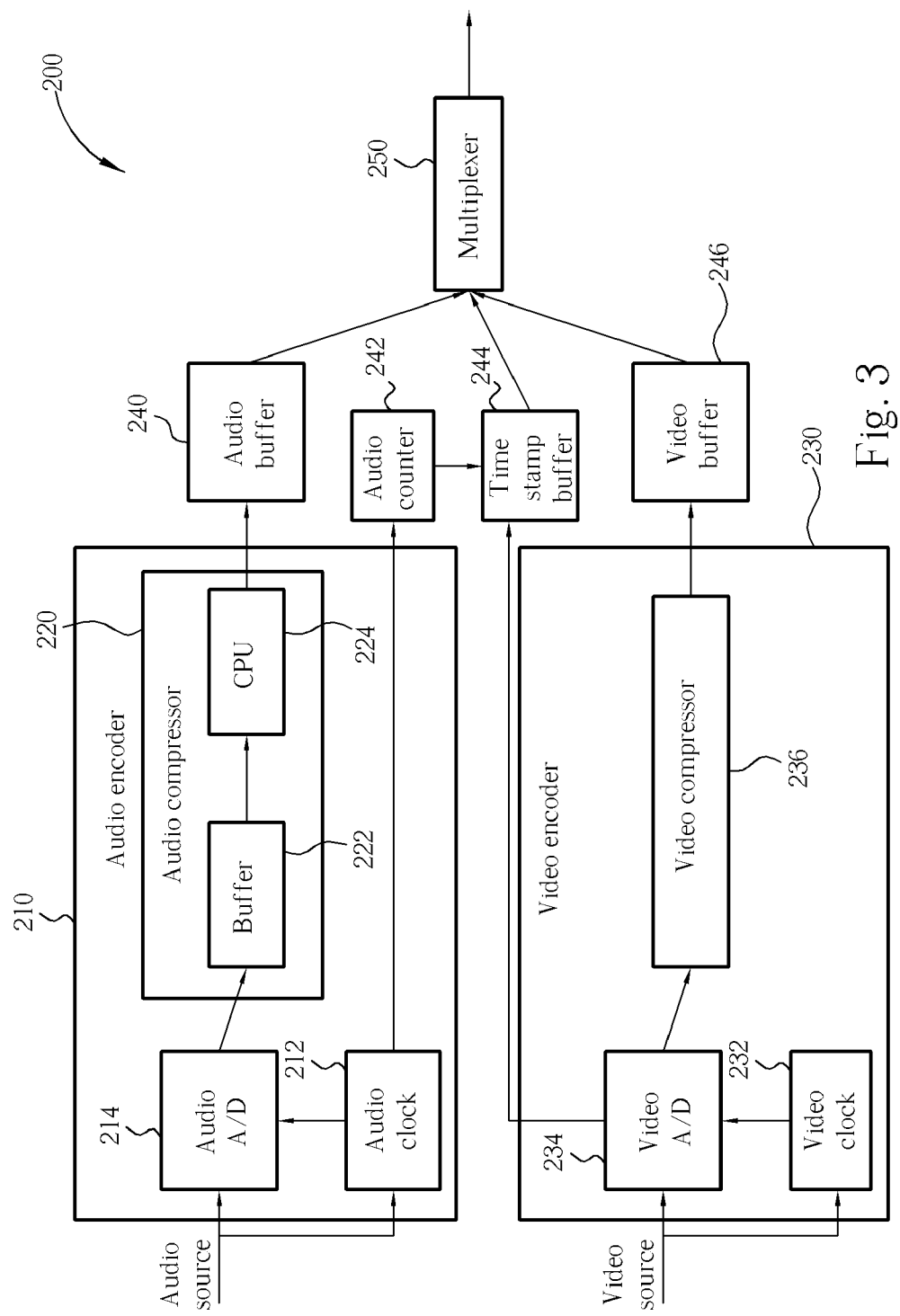
FIG. 3 is a functional block diagram of an encoding system according to the present invention.

Please refer to FIG. 3. FIG. 3 is a functional block diagram of an encoding system 200 according to the present invention. Like the encoding system 100, the encoding system 200 includes an audio encoder 210, a video encoder 230, an audio buffer 240, a video buffer 246, and a multiplexer 250. Additionally, the present invention encoding system 200 also contains an audio counter 242 and a time stamp buffer 244, as will be explained below.

The audio encoder 210 includes an audio A/D converter 214, an audio compressor 220, and an audio clock 212 connected to the audio A/D converter 214 and to an audio source. The video encoder 230 includes a video A/D converter 234, a video compressor 236, and a video clock 232 connected to the video A/D converter 234 and to a video source.

The audio buffer 240 is connected to the audio compressor 220 and the multiplexer 250, and the video buffer 246 is connected to the video compressor 236 and the multiplexer 250. The audio compressor 220 includes an input buffer 222, for temporal storage of audio samples, and a CPU 224, connected therebetween.

The audio A/D converter 214 provides digital audio samples to the compressor 220 at a rate dictated by its sampling audio clock 212. The compressor 220 has no knowledge of the pass of time except through the samples that arrive at its input.

As the audio A/D converter 214 sequentially receives the audio samples from the audio source, the audio clock 212 is continuously running, and the audio counter 242 increments its counter value as clock pulses from the audio clock 212 are received. As the video A/D converter 234 receives one video frame from the video source, the video A/D converter 234 outputs a signal to the time stamp buffer 244 for indicating the receipt of a video frame. The time stamp buffer 244 then loads the current value of the audio counter 242 into the time stamp buffer 244 for recording the time at which the video frame enters the video A/D converter 234 in terms of the audio counter 242. Therefore, the encoded audio frames are stored in the audio buffer 240, the encoded video frames are stored in the video buffer 246, and the time stamps corresponding to the encoded video frames are stored in the time stamp buffer 244. When multiplexing the audio and video streams in the multiplexer 250, the video frames stored in the video buffer 246, the audio frames stored in the audio buffer 240, and the time stamps corresponding to the video frames stored in the time stamp buffer 244 are multiplexed altogether.

Since time stamps created in terms of the audio counter 242 are assigned to corresponding video frames for synchronized recording of the video stream with the audio stream, the time-stamped video frames can be properly synchronized with the corresponding audio signals without encountering any errors of audio/video synchronization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for synchronized recording of audio and video signals, the video signals being grouped into a plurality of video frames, the method comprising:
   incrementing a counter value of an audio counter once an audio sample is received and is encoded by an audio compressor, wherein the counter value represents an index of the received audio samples;
   recording the current counter value of the audio counter once a video frame is received, wherein each recorded counter value represents a time stamp of the received video frame; and
   multiplexing an audio stream comprising the received audio samples, and a video stream comprising the received video frames with the recorded time stamps.

2. The method of claim 1, further comprising:
   receiving the audio sample once a clock pulse is generated by an audio clock, wherein the audio clock is run at a audio sampling rate;
   receiving the video frames, wherein the time stamp associated with each video frame is stored in a time stamp buffer; and
   generating the audio stream and the video stream by compressing the audio data samples and video frames.

3. The method of claim 2, further comprising the step of storing the compressed audio samples in an audio buffer, and storing the compressed video frames in a video buffer.

4. The method of claim 1, wherein the video frames are time stamped as the video frames are received for compression.

5. An apparatus for synchronized recording of audio and video signals, the video signals being grouped into a plurality of video frames, the apparatus comprising:
   an audio counter for incrementing a counter value once an audio sample is received and is encoded by an audio compressor, wherein the counter value represents how many audio samples have been received;
   a time stamp buffer for recording the current counter value of the audio counter once a video frame is received, wherein each recorded counter value represents a time stamp of the received video frame; and
   a multiplexer for multiplexing an audio stream comprising the received audio samples, and a video stream comprising the received video frames with the recorded time stamps.

6. The apparatus of claim 5, further comprising:
   an audio clock run at a audio sampling rate;
   an audio A/D converter for generating the audio sample once the audio clock generates a clock pulse
   a video A/D converter for generating the video frames by digitalizing the video signals; and
   a video compressor for compressing the video frames.

7. The apparatus of claim 6, further comprising:
   an audio buffer for storing the compressed audio samples; and
   a video buffer for storing the compressed video frames.

8. The apparatus of claim 5, wherein the video frames are time stamped as the video frames are received for compression.

* * * * *

UNITED STATES PATENT AND TRADEMARK OFFICE
CERTIFICATE OF CORRECTION

| | | |
|---|---|---|
| PATENT NO. | : 7,634,005 B2 | Page 1 of 1 |
| APPLICATION NO. | : 10/906457 | |
| DATED | : December 15, 2009 | |
| INVENTOR(S) | : Cheng-Che Chen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1111 days.

Signed and Sealed this

Twenty-first Day of December, 2010

David J. Kappos
*Director of the United States Patent and Trademark Office*